United States Patent
Vuong et al.

(10) Patent No.: US 11,909,298 B2
(45) Date of Patent: Feb. 20, 2024

(54) HOUSING OF AN ELECTRIC MACHINE HAVING AN OPTIMIZED SEALING RING

(71) Applicant: Robert Bosch GmbH, Stuttgart (DE)

(72) Inventors: Thieu Huy Vuong, Kaiserslautern (DE); Camilo Andres Carrillo Estupinan, Stuttgart (DE); Stephan Geise, Ruethen (DE)

(73) Assignee: Robert Bosch GmbH, Stuttgart (DE)

( * ) Notice: Subject to any disclaimer, the term of this patent is extended or adjusted under 35 U.S.C. 154(b) by 358 days.

(21) Appl. No.: 17/605,646

(22) PCT Filed: Apr. 1, 2020

(86) PCT No.: PCT/EP2020/059194
§ 371 (c)(1),
(2) Date: Oct. 22, 2021

(87) PCT Pub. No.: WO2020/216588
PCT Pub. Date: Oct. 29, 2020

(65) Prior Publication Data
US 2022/0209627 A1 Jun. 30, 2022

(30) Foreign Application Priority Data
Apr. 26, 2019 (DE) ...................... 10 2019 206 002.1

(51) Int. Cl.
*H02K 9/197* (2006.01)
*H02K 5/20* (2006.01)

(52) U.S. Cl.
CPC ............. *H02K 9/197* (2013.01); *H02K 5/203* (2021.01)

(58) Field of Classification Search
CPC ...................................................... H02K 9/197
See application file for complete search history.

(56) References Cited

U.S. PATENT DOCUMENTS

2002/0063395 A1    5/2002   Klinner et al.

FOREIGN PATENT DOCUMENTS

DE            19757605 A1 *   6/1999   ............... H02K 1/32
DE       102015212442 A1 *   1/2017
(Continued)

OTHER PUBLICATIONS

Translation of International Search Report for Application No. PCT/EP2020/059194 dated Jul. 10, 2020 (2 pages).

*Primary Examiner* — Robert W Horn
(74) *Attorney, Agent, or Firm* — Michael Best & Friedrich LLP

(57) ABSTRACT

The present invention relates to a housing of an electric machine (1), comprising a hollow cylindrical housing element (5), in particular housing jacket, and at least one housing cover (6), which is attached to the end of the housing element (5), a cooling channel (8) being formed in the housing, the housing element (5) having at least two cooling channel sections (8.1) of the cooling channel (8), which each extend from a channel end opening (13) in an end face (11) of the housing element (5) in an axial direction relative to a housing axis (100) into the housing element (5). Two adjacent cooling channel sections (8.1) are flow-connected to each other via a deflection section (8.2) formed in the housing cover (6). There is a sealing gasket (7) for sealing off the cooling channel (8) between the housing element (5) and the housing cover (6), the sealing gasket (7) having through-openings (20) in the region of the channel end openings (13) for directing the cooling channel into the housing cover (6), and the sealing gasket (7) having an annular support (10) and a sealing assembly (9) mounted on the support. The housing is characterized in that the sealing assembly (9) surrounds the support (10) such that the (Continued)

support (10) is completely sealed off from the cooling channel (8) of the housing.

19 Claims, 5 Drawing Sheets

(56) References Cited

FOREIGN PATENT DOCUMENTS

| | | | |
|---|---|---|---|
| DE | 102021123317 A1 * | 3/2023 | ............. H02K 5/203 |
| EP | 1855034 A1 | 11/2007 | |
| WO | WO-2004036720 A1 * | 4/2004 | ............... H02K 5/20 |
| WO | 2006042832 A1 | 4/2006 | |
| WO | 2014106707 A1 | 7/2014 | |
| WO | 2016062440 A2 | 4/2016 | |

* cited by examiner

HOUSING OF AN ELECTRIC MACHINE HAVING AN OPTIMIZED SEALING RING

BACKGROUND OF THE INVENTION

The present invention relates to a housing of an electric machine. Moreover, the invention relates to an electric machine comprising a housing of this kind. The housing has, in particular, an optimized sealing ring.

Stator housings for electrical drive units are known from the prior art. Electrical drive units of this kind are, in particular, electrical machines for vehicles. Stator housings in this case are, in particular, cast-metal housings which are closed by a cover. In order to seal coolant flows which run within the cast-metal housing and the cover, dimensionally stable seals must be inserted with great precision between the components.

Publication WO2016/062440 A3 describes an extruded profile housing with cooling channels in the housing wall running in a meandering fashion. In the case of these extruded profile housings, the cooling medium is diverted through a three-dimensional plastic ring with special webs. Because the plastic ring is produced from polyamide, the webs absorb the water normally used as the cooling medium and swell. The volume change, and also the surface change, resulting from this mean that said webs form an adhesive connection, in particular, with the housing, and cannot be dismantled again or replaced.

Because it is in direct contact with the cooling medium, a special hydrolysis-resistant polyamide must be selected for the dimensionally stable plastic ring. This is hard to manufacture, however, and correspondingly expensive.

A seal is molded on the top of the plastic ring during an additional injection molding process in an injection mold, thereby providing a seal in respect of the cover. Any slippage of this seal can result in faults and particles in the cooling medium flow, as a result of which there is a risk of cooling losses and therefore a failure of the drive unit.

SUMMARY OF THE INVENTION

The housing of an electric machine according to the invention has a hollow cylindrical housing element. A cooling channel is formed in the housing. The hollow cylindrical housing element is preferably a housing jacket and comprises individual cooling channel portions of the cooling channel, which extend radially in the housing element in respect of a housing axis. The hollow cylindrical housing element is preferably rotationally symmetrical to the housing axis. Moreover, the housing has at least one housing cover which is attached to the end of the housing element. The housing element comprises at least two different cooling channel portions of the cooling channel, which are completely separate from one another, particularly advantageously within the housing element. The cooling channel portions each extend from a channel end opening in an end face of the housing element into the housing element. The housing cover is attached to the aforementioned end face, wherein a gasket, which is particularly ring-shaped, is arranged between the housing element and the housing cover. The housing cover has a recess which is formed as a deflection portion of the cooling channel, in order to connect the flows of two, in particular adjacent, channel end openings and therefore two cooling channel portions. In this way, the cooling channel, along which a cooling medium flows, runs from one of the cooling channel portions through a through-opening in the gasket, through the deflection portion formed in the housing cover, and through a further through-opening in the gasket, to another cooling channel portion. In particular, the gasket and the deflection portion formed in the housing cover can allow the cooling channel to run from a cooling channel portion of the housing element to an adjacent cooling channel portion of the housing element. In this way, a meandering form of the cooling channel can be achieved.

The gasket exhibits the aforementioned through-openings at the point of the channel end openings. Moreover, the gasket has a sealing assembly for sealing the cooling channel between the housing element and the housing cover and housing cover, and a support for holding the sealing assembly. The support is, in particular, ring-shaped. It is provided in this case that the sealing assembly completely screens the support from fluid running along the cooling channel. This means that the sealing assembly encloses the support in such a manner that said support is completely sealed off from the cooling channel of the housing. Consequently, the support can, in particular, be prevented from coming into contact with cooling medium and thereby being changed by said cooling medium, in particular swollen up.

The support is advantageously produced from a glass fiber-filled thermoplastic which is, in particular, produced in a first injection molding step. The sealing assembly is, in particular, liquid silicone rubber (LSR), which is sprayed onto the support during a subsequent injection-molding process. Consequently, the sealing assembly can guarantee an optimal sealing action between the housing element and the housing cover, so that, on the one hand, cooling medium is prevented from escaping, while, on the other hand, the flow of cooling medium within the cooling channel is undisturbed. The cooling medium is, in particular, water.

Because the support is completely sealed off from the cooling medium by the sealing assembly, it can be produced from a material that is reasonably priced and does not necessarily have to be hydrolysis-resistant. This means that a reasonably priced plastic which is easy to manufacture can be used.

The dependent claims contain preferred developments of the invention.

It is preferably provided that the support has an inner ring and an outer ring, as well as webs connecting the inner ring and outer ring. The support in this case has, in particular, an integral design. Through-openings through which cooling medium can flow therefore remain between the inner ring, outer ring and webs. The webs advantageously allow a transition between two cooling channel portions. Moreover, the through-openings allow, in particular, a transition between cooling channel portions of the housing element and recesses in the housing cover. In particular, fluid can escape from the cooling channel portion into a recess in the housing cover and pass through the recess to reach an adjacent cooling channel portion. In this way, the previously described meander-shaped cooling channel can be achieved easily and economically. The use of support allows the geometry of the gasket to be defined easily and economically. In particular, the support is produced from an easy-to-manufacture material, so that the geometry of the gasket can be defined easily and economically, in particular with minimal cost.

It is particularly advantageously provided that the inner ring and the outer ring are surrounded by the sealing assembly in a C-shaped or clip-shaped manner. This means that the inner ring projects radially inwards in respect of the sealing assembly or ends flush therewith. The outer ring projects radially outwards in respect of the sealing assembly or ends flush therewith. Since there is no cooling medium present at these points, the support is completely sealed off from said cooling medium. The C-shape of the sealing assembly means that an improved mechanical hold of the sealing assembly on the support is achieved through form-fitting. Consequently, the risk of any slippage of the sealing assembly is reduced, which means, in particular, that the risk of a disturbance of the flow of cooling medium is reduced. Consequently, the housing allows optimal cooling of an electric machine located therein and therefore safe and reliable operation of the electrical machine.

The webs are preferably completely surrounded by the sealing assembly. Because the webs are used, in particular, to delimit adjacent cooling channel portions, said webs are completely exposed to the cooling medium. By completely surrounding the support with the sealing assembly, it is guaranteed that said support is completely sealed off from the cooling medium.

The sealing assembly preferably encloses the inner ring and the outer ring in a clip-shape or C-shape manner, this being viewed in cross section from one of the two ends of the support, via an inner circumference facing the cooling channel, to the other end of the support. In this case, the webs are particularly advantageously completely enclosed by the sealing assembly, as previously described. Consequently, on the one hand, the sealing assembly is reliably fixed to the support; on the other hand, the support is sealed off from the cooling channel. Contact between the cooling medium and the support is therefore avoided.

Furthermore, it is particularly advantageously provided that the sealing assembly comprises a first layer thickness over the inner ring and/or over the outer ring. The sealing assembly either also has the first layer thickness over the webs or, alternatively, a second layer thickness, wherein the second layer thickness is smaller than the first layer thickness. Consequently, there is a first group of webs comprising the sealing assembly with the first layer thickness, while a second group of webs comprises the sealing assembly with the second layer thickness. In particular, it is provided that all webs can be assigned either to the first group or to the second group. The first group of webs therefore allows adjacent cooling channel portions to be completely sealed off. In particular, no fluid can flow via the webs due to the sealing assembly, which is present there with the same layer thickness as over the outer ring and the inner ring. Since the outer ring and the inner ring are provided for complete sealing between the housing element and the housing cover, the sealing assembly attached with the same first layer thickness over the webs of the first group likewise leads to a complete seal between the housing element and the housing cover. By contrast, the webs in the second group, which comprise the sealing assembly with the smaller second layer thickness, allow a connection between adjacent cooling channel portions. Due to the smaller second layer thickness, the sealing assembly in this case cannot produce a complete seal between the housing element and the housing cover. Consequently, a transition between adjacent cooling channel portions is made possible, as a result of which the meandering form of the cooling channel described above is achieved. On the webs of the second group, the sealing assembly is therefore only used to shield the support from the cooling medium. In an alternative embodiment, the sealing assembly may have a uniform layer thickness, so that the first group of webs is not distinguished from the second group of webs, as described above.

In a particularly preferred embodiment, the sealing assembly forms a sealing surface on the webs of the first group, in order to seal off adjacent cooling channel portions. On the webs of the second group, the sealing assembly forms a connecting surface, in order to connect adjacent cooling channel portions. Consequently, through a corresponding selection of webs from the first group and webs from the second group, cooling channels can be created which run in meandering fashion through the entire housing of the electrical machine, which means, in particular, that adjacent cooling channel portions are flowed through in opposite directions within the housing element.

The support advantageously has a constant wall thickness. This means that the support can be produced easily and cost-effectively. The wall thickness is, in particular, the dimension of the support along the center axis of the ring shape of the gasket.

The support is advantageously encapsulated with the sealing assembly, at least in part. In particular, the support is an injection-molded part which is encapsulated with the sealing assembly in a subsequent injection process. Consequently, simple and economical production of the gasket is made possible.

The support is preferably produced from a thermoplastic material which is, in particular, fiber-filled. In particular, the support is produced from a thermoplastic material. This can be manufactured easily and economically, which means that the support can be produced simply and cost-effectively.

The sealing assembly is preferably produced from an elastomer. Consequently, the sealing assembly can optimally adopt a sealing function. The elastomer is advantageously resistant to the cooling medium used, which may, in particular, be water.

The support preferably has at least one centering pin. Particularly advantageously, there are multiple centering pins on the support. The at least one centering pin makes it possible for the gasket to be centered on the housing element and/or the housing cover. If there are multiple centering pins present, which are particularly advantageously arranged symmetrically, only a single orientation of the gasket during assembly of the gasket is possible. In this way, the gasket is particularly prevented from being wrongly mounted on the housing element and/or the housing cover.

Using the support means that the gasket has high dimensional stability. In particular, distortion of the gasket is minimized. At the same time, the sealing effect of the gasket is optimized.

The invention preferably also relates to an electric machine. This comprises a rotor, a stator, and a housing, as previously described. It is provided in this case that the stator is attached to the hollow cylindrical housing element of the housing.

BRIEF DESCRIPTION OF THE DRAWINGS

Exemplary embodiments of the invention are described in detail below with reference to the accompanying drawing. In the drawing.

DETAILED DESCRIPTION

Figure 1:
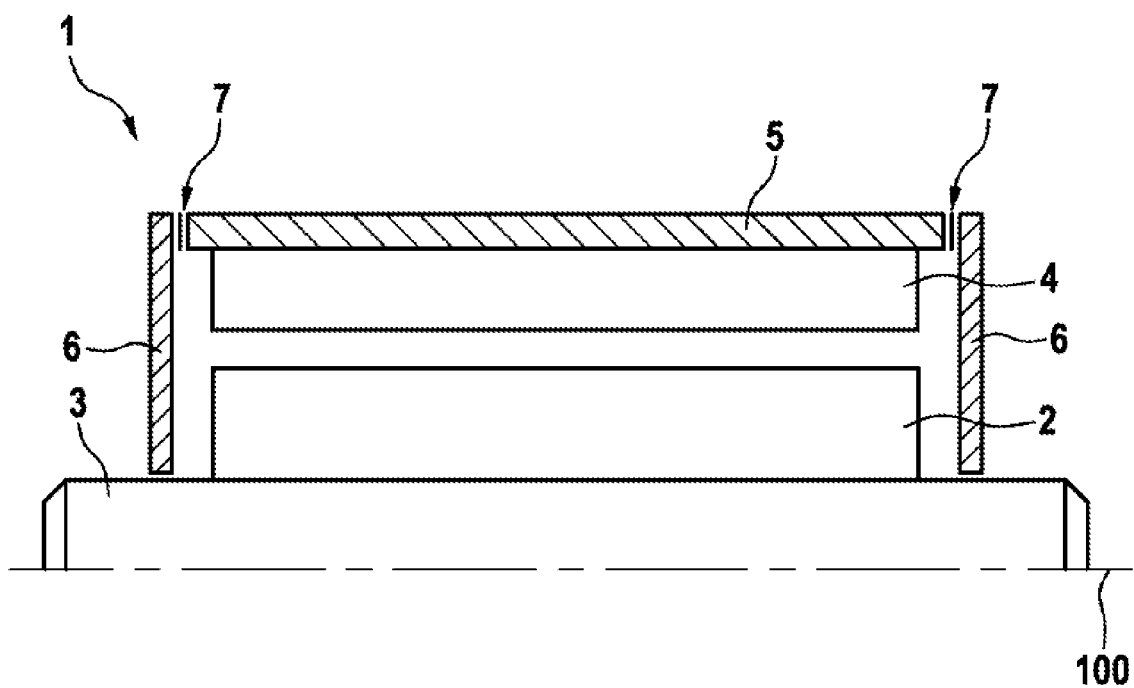
FIG. 1 shows a schematic view of an electric machine according to an exemplary embodiment of the invention.

FIG. 1 shows schematically an electric machine 1 according to an exemplary embodiment of the invention. The electric machine 1 comprises a rotor shaft 3, to which a rotor 2 is attached. The rotor shaft 3 extends along a housing axis 100 of a housing of the electric machine 1. Moreover, the electric machine 1 comprises a housing element 5 which has a hollow cylindrical design and supports a stator 4. The rotor 2 can be driven by the stator 4, so that the rotor shaft 3 is rotatable. In particular, the housing axis 100 represents a center axis of the housing element 5.

The housing has at least one housing cover 6 attached to an end 7 of the housing element 5. A gasket 7 is attached between the housing cover 6 and the housing element 5. The interaction between the housing element 5, housing cover 6 and gasket 7 is explained in greater detail below with reference to FIGS. 2 to 7.

Figure 2:
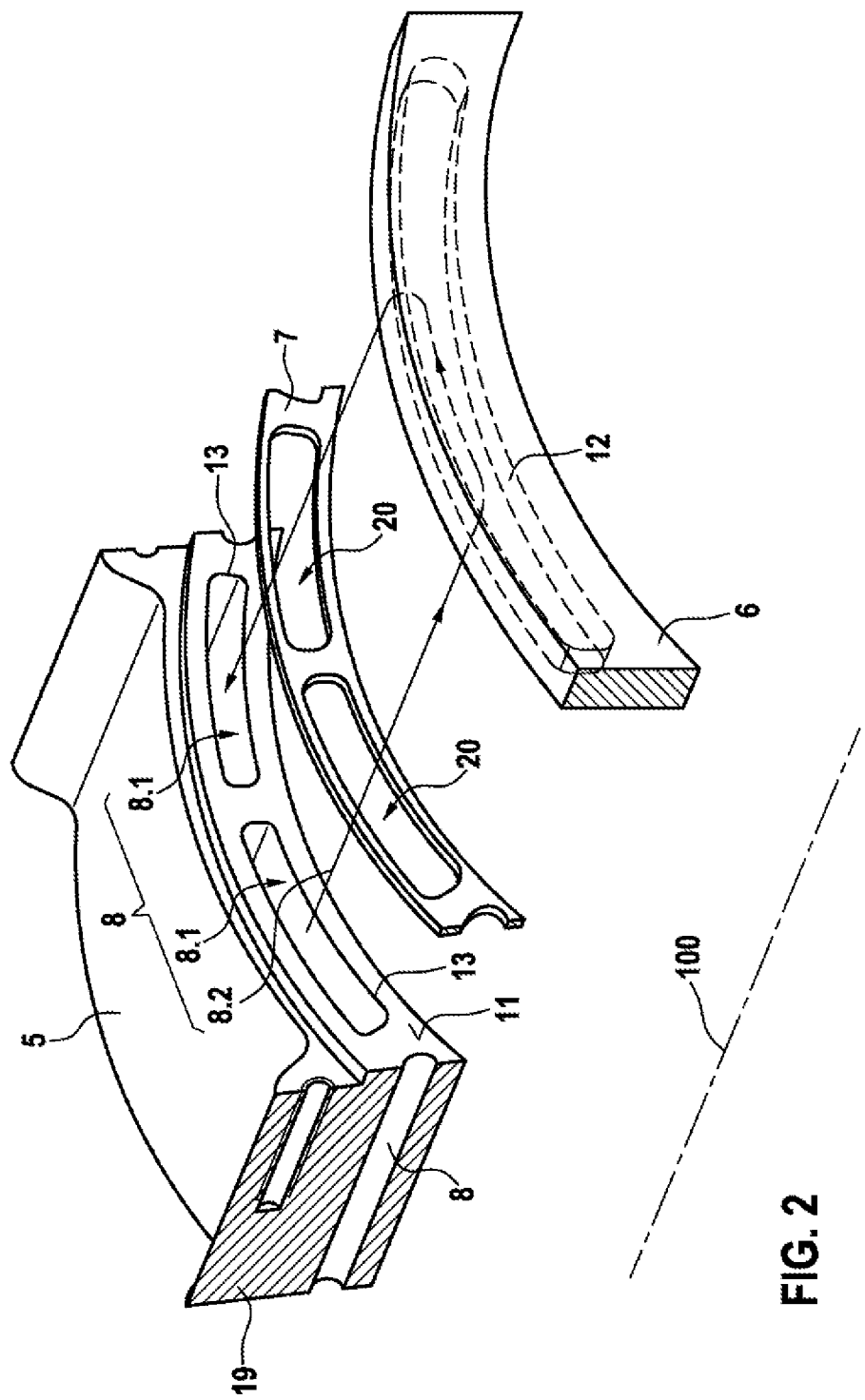
FIG. 2 shows a schematic exploded view of a partial region of the electric machine.

FIG. 2 shows a schematic exploded view of a partial region of the housing of the electrical machine 1, wherein only the housing element 5, the housing cover 6, and the gasket 7 are schematically depicted. As a point of reference, the same housing axis 100 of the rotor shaft 3 as shown in FIG. 1 is marked. A cooling channel 8 is formed in the housing.

In the schematic example shown in FIG. 2, the cooling channel 8 has two cooling channel portions 8.1, wherein the cooling channel portions 8.1 are connected by a deflection portion 8.2 of the cooling channel 8 realized in a recess 12 of the housing cover 6, so that a meander-shaped cooling channel 8 is thereby established. It is provided for this purpose that an end face 11 of the housing element 5 has two channel end openings 13, wherein a cooling channel portion 8.1 extends axially in respect of the housing axis 100 from each channel end opening 13 through the housing element 5. The deflection portion 8.2 created by the recess 12 in the housing cover 6 is configured in such a manner that it extends over both channel end openings 13. The gasket 7 is attached between the end face 11 and the housing cover 6 and acts as a seal between the housing cover 6 and the housing element 5. Continuous openings 20 are provided at the points of the gasket 7 corresponding to the channel end openings 13, in order to allow an unobstructed fluid flow through the cooling channel 8. The gasket 7 prevents the cooling medium, which flows along the cooling channel 8, from being able to escape from the assembly of the housing element 5 and the housing cover 6. At the same time, the gasket 7 should not have a negative effect on the cooling channel 8.

Housing ribs 19, in particular, are provided in order to connect the housing element 5 to the housing cover 6. They preferably have a thread which can be used for the screw connection between the housing element 5 and the housing cover 6.

Figure 3:
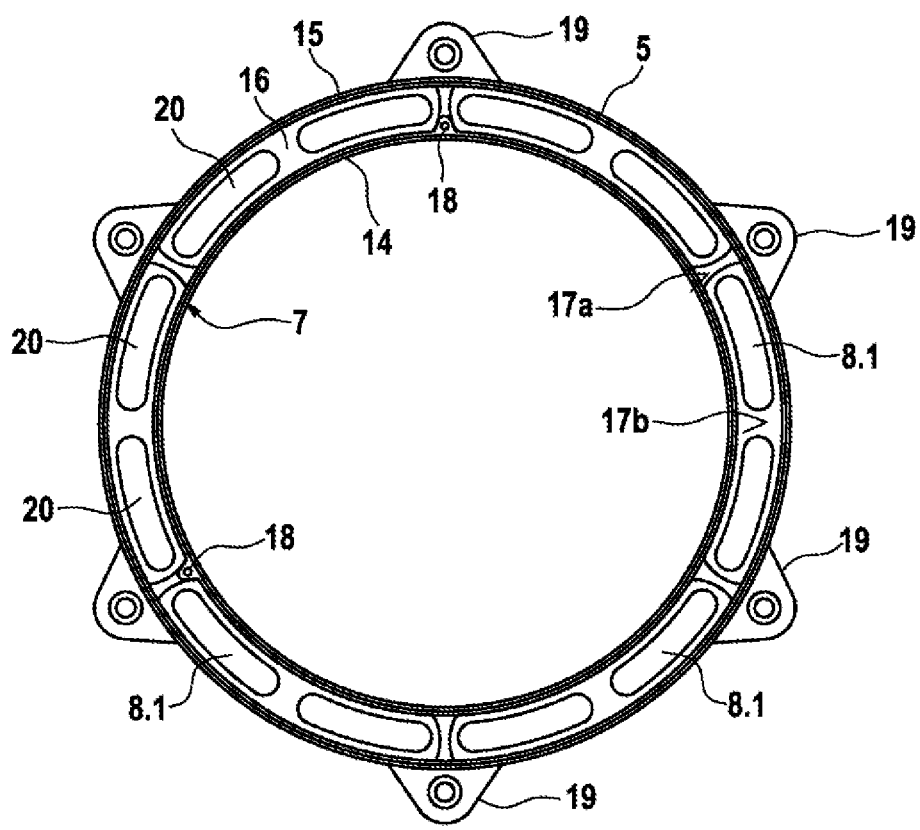
FIG. 3 shows a schematic detail view of a housing element of the electric machine according to the exemplary embodiment of the invention with a gasket.
Figure 4:
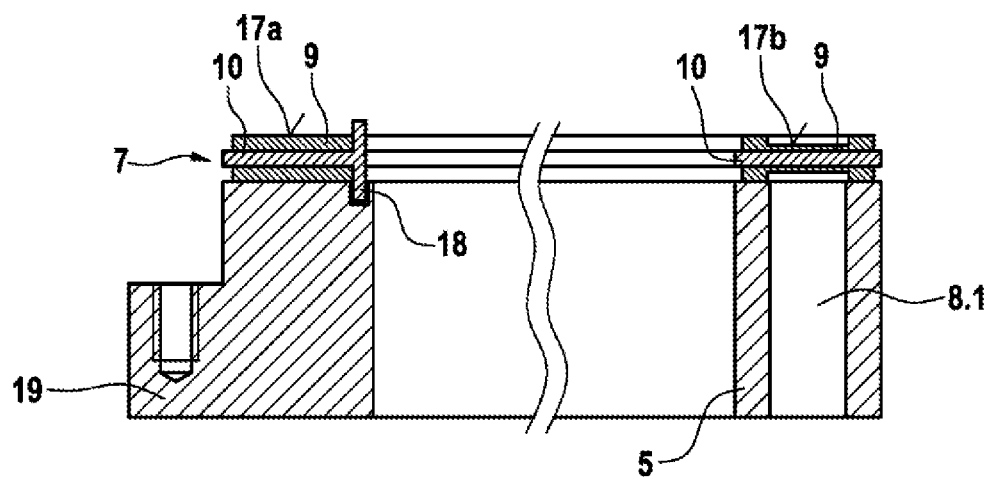
FIG. 4 shows a schematic sectional view of the housing element of the electric machine according to the exemplary embodiment of the invention with the gasket.
Figure 5:
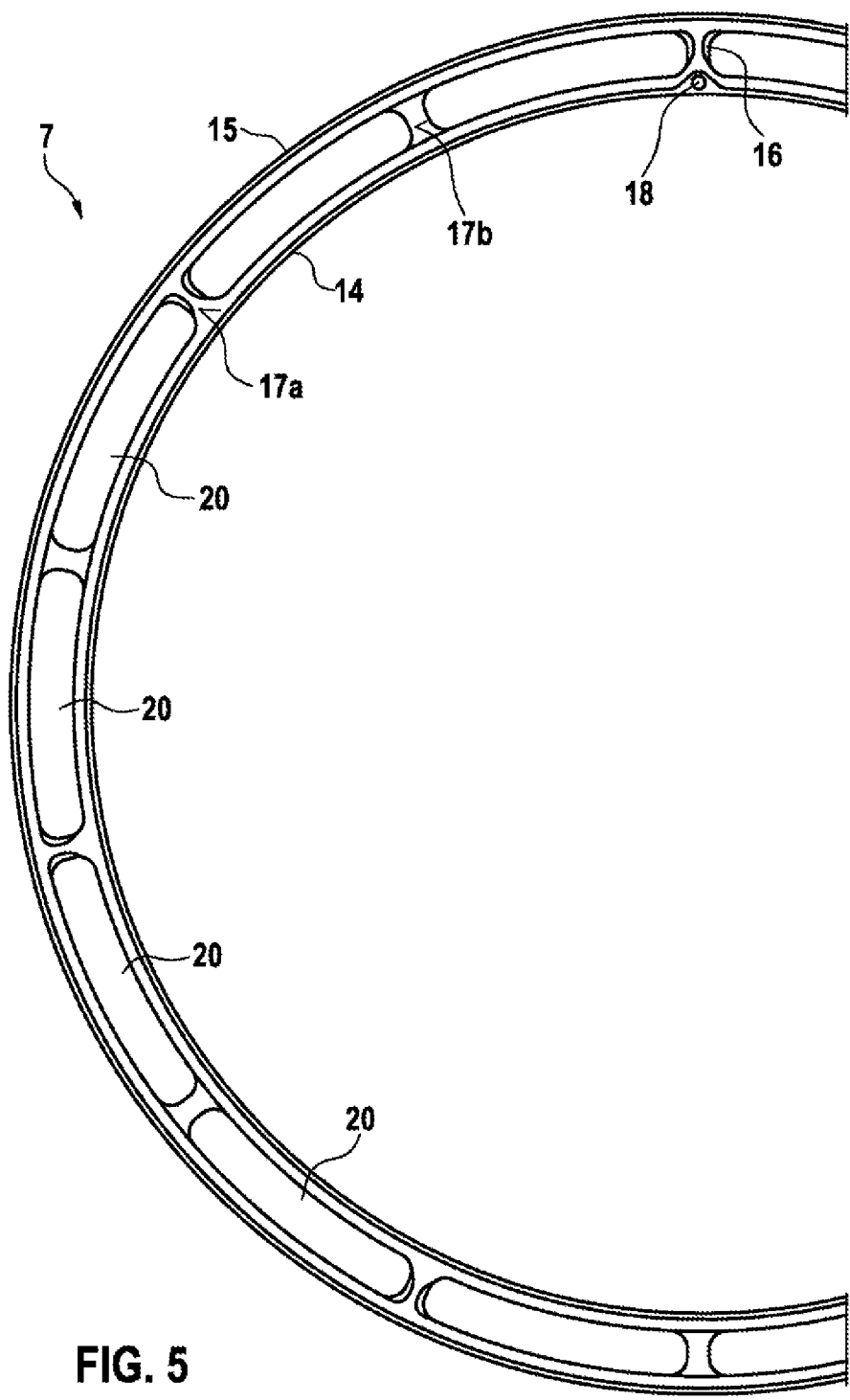
FIG. 5 shows a schematic detail view of the gasket of the electric machine according to the exemplary embodiment of the invention.

FIGS. 3 and 4 show the housing element 5 with the gasket 7 attached. It is provided in this case that the gasket 7, an inner ring 14, an outer ring 15 and connecting webs 16 between the inner ring 14 and the outer ring 15 are provided. In order to connect two adjacent cooling channel portions 8.1, as shown in FIG. 2, the gasket 7 has two different groups of webs 16. Webs from a first group are formed with sealing surfaces 17a for sealing between the housing element 5 and the housing cover 6. Webs 16 from a second group are provided with connecting surfaces 17b for connecting two adjacent cooling channel portions 8.1. All webs 16 can be assigned either to the first group or the second group. FIG. 5 shows, in particular, the embodiment of the webs 16 in the first group and the second group in detail.

In order to achieve a clear fixing of the gasket 7 relative to the housing element 5 and the housing cover 6, at least two centering pins 18 are attached to the inner ring 14. These centering pins 18 are arranged on the inner ring 14 in non-symmetrical fashion, so that the gasket 7 can only be arranged in a single orientation on the housing element 5. The gasket 7 is therefore prevented from being wrongly assembled.

Figure 6:
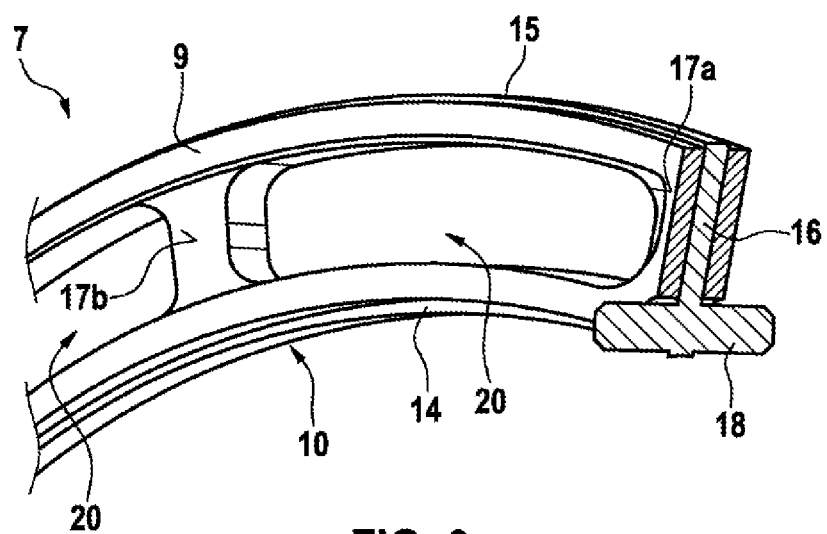
FIG. 6 shows a further schematic detail view of the gasket of the electric machine according to the exemplary embodiment of the invention.
Figure 7:
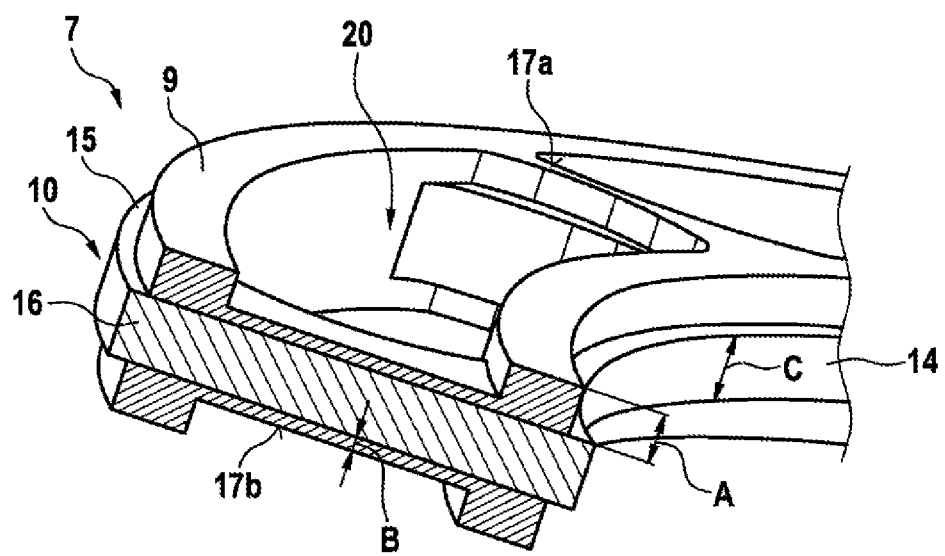
FIG. 7 shows yet a further schematic depiction of the gasket of the electric machine according to the exemplary embodiment of the invention.

FIGS. 4, 6 and 7 are jointly described below. In particular, it can be seen from these figures how the webs 16 of the first group and the webs 16 of the second group are differently formed, so that the sealing surface 17a, on the one hand, and the connecting surface 17b, on the other, are formed. As particularly emerges from FIGS. 6 and 7, the gasket 7 has a two-part design. A sealing assembly 9 is attached to a support 10, wherein the support 10 is used to define the shape of the gasket 7, while the sealing assembly 9 adopts the sealing function. The support 10 therefore comprises the inner ring 14 and the outer ring 15, and also the connecting webs 16, wherein the support 10 has an integral design. The support 10 may be produced from a fiber-filled, thermoplastic material, for example, and obtain its shape by injection molding. A wall thickness of the support 10 is preferably constant and corresponds to the wall thickness C depicted in FIG. 14.

So that the support 10 can be produced from a material that is easy to manufacture and cost-effective, it is advantageous if no hydrolysis-resistant materials have to be used. This requires that the support 10 does not to come into contact with the cooling medium flowing along the cooling channel 8. Consequently, the sealing assembly 9 completely shields the support 10 from the cooling medium. For this purpose, the sealing assembly 9 encloses the inner ring 14 and the outer ring 15 in a C-shaped fashion and encloses the webs 16 completely. Consequently, the outer ring 15 projects radially outwards from the sealing assembly 9, while the inner ring 14 projects radially inwards from the sealing assembly 9. At this point, however, there is no cooling medium present, which means that there can be no contact between the cooling medium and support 10. The projection of the support 10 from the sealing assembly 9 enables the gasket 7 to be fixed to the housing element 5 and/or the housing cover 6 via the support 10, so that the gasket 7 can be fixed in a dimensionally stable manner with little movement. The cooling channel 8 can thereby be prevented, in particular, affected by a slippage of the gasket 7.

The sealing assembly 9 is, in particular, an elastomer, for example liquid silicone rubber (LSR). This material can advantageously be sprayed onto the support 10, so that the gasket 7 can be produced easily and economically by a two-phase injection-molding process.

In order to achieve the previously described advantage of the selective sealing of two adjacent cooling channel portions 8.1 by the sealing surface 17a, and the connection of two adjacent cooling channel portions 8.1 by the connecting surface 17b, it is provided that the sealing assembly 9 has different layer thicknesses on the webs 16. While the sealing assembly 9 has a constant first layer thickness A on both the inner ring 14 and on the outer ring 15, the layer thickness of the sealing assembly 9 on the webs 9 is optionally either the first layer thickness A or a second layer thickness B, which is smaller than the first layer thickness A.

In particular, the sealing assembly 9 with the first layer thickness A is present on webs 16 belonging to the first group, while the sealing assembly 9 with the second layer thickness B is present on webs 16 belonging to the second group. In this way, the sealing assembly 9 with the same first layer thickness A as is also on the inner ring 14 and outer ring 15 is present on the webs 16 belonging to the first group. Since the inner ring 14 and the outer ring 15 must be completely sealed off from the housing element 5 and the housing cover 6, there is likewise a complete seal on the webs 16 of the first group through the first layer thickness A, as a result of which the sealing surface 17*a* is generated. This means that no cooling medium can flow over the webs 16 of the first group which have the sealing surface 17*a*. Instead, adjacent cooling channel portions 8.1 are completely separate. By contrast, the connecting surface 17*b* is formed on the webs 16 belonging to the second group due to the sealing assembly 9 with the second layer thickness B, as the sealing assembly 9 in this case cannot achieve a sealing action due to the smaller layer thickness by comparison with the region of the inner ring 14 and outer ring 15. Consequently, cooling medium can flow via the webs 16 of the second group, as a result of which the connecting surface 17*b* is achieved, which allows a connection to be made between adjacent cooling channel portions 8.1. In an alternative embodiment, the recesses 12 in the housing cover 6 can therefore be dispensed with.

Irrespective of the first layer thickness A and the second layer thickness B, it is ensured for all webs 16 that they are completely surrounded by the sealing assembly 9. Consequently, it is achieved in this case that the webs 16, and therefore the entire support 10, are sealed off from the cooling medium by the sealing assembly 9. Cooling medium is therefore prevented from being able to come into contact with the support 10, as a result of which the support 10 is prevented from swelling up. The gasket 7 is therefore very dimensionally stable and durable.

The gasket 7 may, in particular, be used in electric machines which are used as a vehicle drive. These may, in particular, be externally excited synchronous machines.

The invention claimed is:

1. A housing of an electric machine (1) comprising a hollow cylindrical housing element (5) and at least one housing cover (6) which is attached to the end of the housing element (5),
    wherein a cooling channel (8) is formed in the housing,
    wherein the housing element (5) has at least two cooling channel portions (8.1) of the cooling channel (8),
    wherein the cooling channel portions (8.1) each extend axially in respect of a housing axis (100) in the housing element (5) from respective channel end openings (13) in an end face (11) of the housing element (5),
    wherein flows of two adjacent cooling channel portions (8.1) are each connected to one another via a deflection portion (8.2) formed in the housing cover (6),
    wherein a gasket (7) for sealing the cooling channel (8) is arranged between the housing element (5) and the housing cover (6), wherein the gasket (7) has through-openings (20) in a region of the channel end openings (13) for conducting the cooling channel in the housing cover (6), and
    wherein the gasket (7) has a ring-shaped support (10) and a sealing assembly (9) arranged on the support,
    characterized in that the sealing assembly (9) encloses the support (10) in such a manner that said support (10) is completely sealed off from the cooling channel (8) of the housing.

2. The housing as claimed in claim 1, characterized in that the support (10) has an inner ring (14), an outer ring (15), and webs (16) connecting the inner ring (14) and the outer ring (15).

3. The housing as claimed in claim 2, characterized in that the inner ring (14) and the outer ring (15) are each surrounded by the sealing assembly (9) in a C-shaped or clip-shaped manner, so that the inner ring (14) projects radially inwards and the outer ring (15) projects radially outwards from the sealing assembly (9).

4. The housing as claimed in claim 2, characterized in that the webs (16) are completely surrounded by the sealing assembly (9).

5. The housing as claimed in claim 2, characterized in that the sealing assembly (9) encloses the inner ring (14) and the outer ring (15) in a clip-shape or C-shape manner, as viewed in cross section from one of two ends of the support (10), via an inner circumference facing the cooling channel (8), to an other end of the support (10).

6. The housing as claimed in claim 2, characterized in that the sealing assembly (9) comprises a first layer thickness (A) over the inner ring (14) and/or over the outer ring (15), wherein the sealing assembly (9) has the first layer thickness (A) over a first group of webs (16) and a second layer thickness (B) over a second group of webs (16), wherein the second layer thickness (B) is smaller than the first layer thickness (A).

7. The housing as claimed in claim 6, characterized in that the sealing assembly (9) forms a sealing surface (17*a*) on the webs (16) of the first group, in order to seal off adjacent cooling channel portions (8.1), and on the webs (16) of the second group, the sealing assembly forms a connecting surface (17*b*), in order to connect adjacent cooling channel portions (8.1).

8. The housing as claimed in claim 1, characterized in that the support (10) has a constant wall thickness (C).

9. The housing as claimed in claim 1, characterized in that the support (10) is encapsulated with the sealing assembly (9), at least in part.

10. The housing as claimed in claim 1, characterized in that the support (10) is produced from a thermoplastic material.

11. The housing as claimed in claim 1, characterized in that the sealing assembly (9) is produced from an elastomer.

12. The housing as claimed in claim 1, characterized in that the support (10) comprises at least one centering pin (18), in order to center the gasket (7) on the housing element (5) and/or the housing cover (6).

13. An electric machine (1) comprising a housing as claimed in claim 1, a rotor (2), and a stator (4), wherein the stator (4) is attached to the hollow cylindrical housing element (5) of the housing.

14. The housing as claimed in claim 1, wherein the housing element (5) is a housing jacket.

15. The housing as claimed in claim 1, characterized in that the support (10) has an inner ring (14), an outer ring (15), and webs (16) connecting the inner ring (14) and the outer ring (15), wherein the inner ring (14), the outer ring (15), and the webs (16) have an integral design.

16. The housing as claimed in claim 2, characterized in that the inner ring (14) and the outer ring (15) are each surrounded by the sealing assembly (9) in a C-shaped or clip-shaped manner, so that the inner ring (14) and the outer ring (15) end flush with the sealing assembly (9).

17. The housing as claimed in claim 1, characterized in that the support (10) is produced from a thermoplastic material which is fiber-filled.

18. The housing as claimed in claim 10, characterized in that the sealing assembly (9) is produced from an elastomer.

19. The housing as claimed in claim 1, characterized in that the support (10) comprises multiple centering pins (18), in order to center the gasket (7) on the housing element (5) and/or the housing cover (6).

\* \* \* \* \*